(12) United States Patent
Hill et al.

(10) Patent No.: US 11,971,599 B2
(45) Date of Patent: Apr. 30, 2024

(54) SEALED OPTICAL FIBER TERMINAL

(71) Applicant: Clearfield, Inc., Minneapolis, MN (US)

(72) Inventors: John P. Hill, Oak Grove, MN (US); Daniel J. Johnson, Blaine, MN (US); Randy T. VanHorn, Princeton, MN (US); Walter E. Power, II, Jordan, MN (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 18/307,249

(22) Filed: Apr. 26, 2023

(65) Prior Publication Data

US 2023/0258903 A1 Aug. 17, 2023

Related U.S. Application Data

(63) Continuation of application No. 16/590,931, filed on Oct. 2, 2019, now Pat. No. 11,644,631.

(60) Provisional application No. 62/740,135, filed on Oct. 2, 2018.

(51) Int. Cl.
*G02B 6/44* (2006.01)
(52) U.S. Cl.
CPC ......... *G02B 6/4471* (2013.01); *G02B 6/4454* (2013.01)
(58) Field of Classification Search
None
See application file for complete search history.

(56) References Cited

U.S. PATENT DOCUMENTS

| | | | | |
|---|---|---|---|---|
| 6,285,815 B1* | 9/2001 | Daoud | ................ | G02B 6/4471 385/137 |
| 7,272,291 B2* | 9/2007 | Bayazit | ................ | G02B 6/4454 385/137 |
| 8,380,034 B2* | 2/2013 | Fleouter | ............... | G02B 6/4454 385/135 |
| 9,348,105 B2* | 5/2016 | Rudenick | ............... | G02B 6/444 |
| 9,513,451 B2* | 12/2016 | Corbille | ............... | G02B 6/4494 |
| 9,575,278 B2* | 2/2017 | Leclerc | ............... | G02B 6/4471 |
| 10,295,773 B2* | 5/2019 | Leonard | ............... | G02B 6/4454 |
| 10,852,498 B2* | 12/2020 | Hill | ...................... | G02B 6/4454 |
| 11,644,631 B2* | 5/2023 | Hill | ...................... | G02B 6/4454 385/135 |
| 2007/0280619 A1* | 12/2007 | Conner | ................ | G02B 6/4471 385/135 |
| 2010/0183274 A1* | 7/2010 | Brunet | ................ | G02B 6/4452 385/135 |

(Continued)

*Primary Examiner* — Rhonda S Peace
(74) *Attorney, Agent, or Firm* — Troutman Pepper Hamilton Sanders LLP

(57) ABSTRACT

A sealed terminal has a housing, a cover, a splice tray, an adapter plate, and a splice chip. The cover is connected to the housing to close an interior compartment and has input ports for receiving one or more cables and an output adapter module having a plurality of distribution ports. The splice tray is positioned in the interior compartment and has one or more cable retainers configured to route the one or more cables within the interior compartment. The adapter plate is connected to the splice tray and has a plurality of adapters for connecting the one or more cables to the distribution ports. The splice chip is connected to the splice tray and has a plurality of slots for receiving and routing the one or more cables. The housing includes a radiused wall for routing the cables within the interior compartment without bending the cables.

18 Claims, 12 Drawing Sheets

(56) References Cited

U.S. PATENT DOCUMENTS

2013/0108225 A1\* 5/2013 Ray .................. G02B 6/4454
385/95

\* cited by examiner

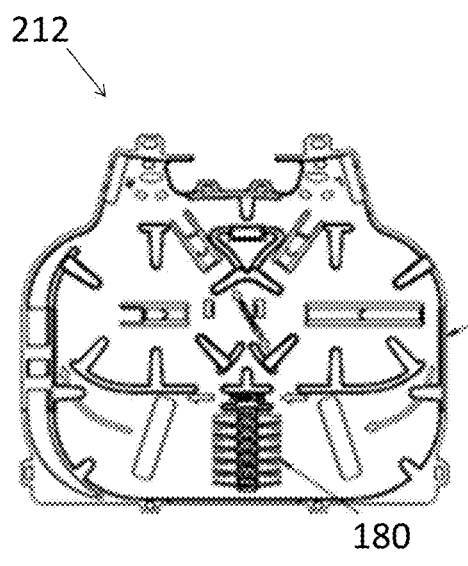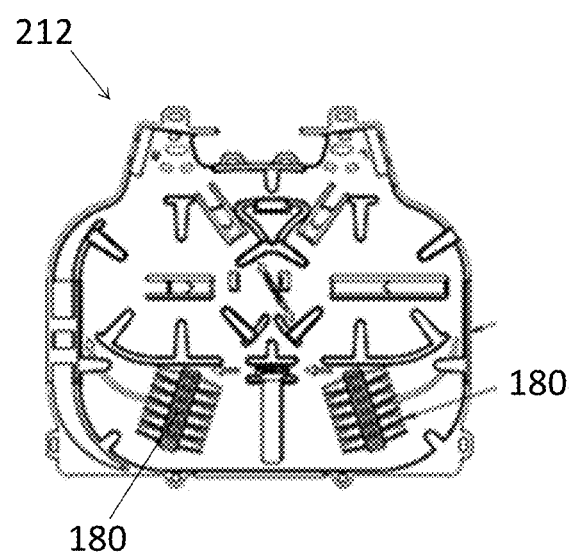
*FIG. 11A*  *FIG. 11B*

*FIG. 12A*
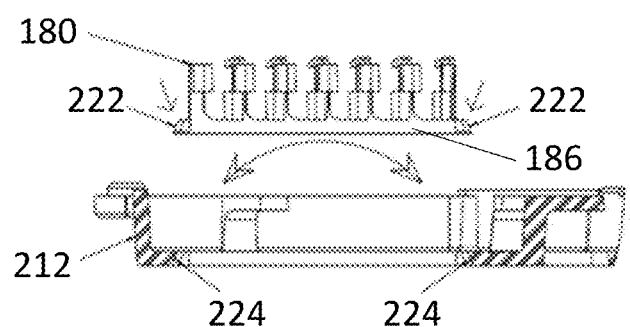
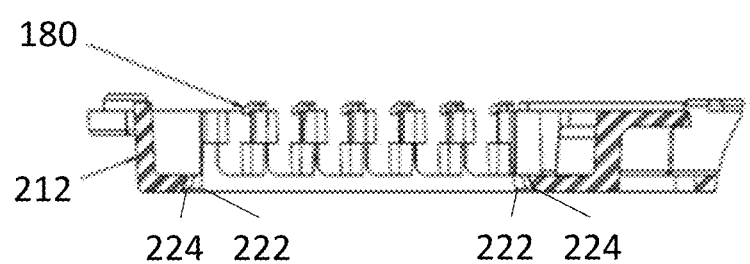
*FIG. 12B*

SEALED OPTICAL FIBER TERMINAL

CROSS-REFERENCE TO RELATED APPLICATIONS

This application is a continuation of U.S. patent application Ser. No. 16/590,931 filed Oct. 2, 2019 and claims the benefit of priority of U.S. Provisional Application Ser. No. 62/740,135 filed Oct. 2, 2018, both of which are incorporated herein by reference in their entirety.

TECHNICAL FIELD

The present disclosure relates generally to optical fiber communications, and more specifically to sealed optical fiber terminals.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable. In instances when the connection may be exposed to weather conditions, an essentially waterproof configuration of components is needed.

To interconnect the cables, various cable connector designs provide for low insertion loss and stability. Some example connectors may include, but are not limited to, SC, Dual LC, LC, ST and MPO connectors. In most of these designs, ferrules (one in each connector, or one in the connector and one in the apparatus or device), each containing an optical fiber end, are butted together end to end and light travels across the junction.

With the increasing desire for completely optical networks, "fiber to the premises" (FTTP) or "fiber to the home" (FTTH) systems are being developed to provide optical fibers that extend from the source to the site of the end-user. For this purpose, optical connection terminals are needed for interconnection of various lines with drop cables that extend to user locations. Further, there is a need for flexible, customizable fiber distribution systems that may be easily expanded or reconfigured.

SUMMARY

In at least some embodiments, the present disclosure describes a sealed terminal. The sealed terminal includes a housing including an interior compartment. The sealed terminal also includes a cover connected to the housing to close the interior compartment. The cover includes a plurality of input ports for receiving one or more cables, and an output adapter module including a plurality of distribution ports each for receiving a connector for active connection to the one or more cables. The sealed terminal additionally includes a splice tray positioned in the interior compartment and including one or more cable retainers configured to route the one or more cables within the interior compartment. The sealed terminal further includes an adapter plate connected to the splice tray and including a plurality of adapters for connecting the one or more cables to the plurality of distribution ports. The sealed terminal also includes a splice chip connected to the splice tray and including a plurality of slots for receiving and routing at least one of the one or more cables.

According to some disclosed embodiments, the housing includes a distal end having a radiused wall for routing the one or more cables within the interior compartment without bending of the one or more cables.

According to some disclosed embodiments, the splice tray includes a radiused wall parallel to the radiused wall of the housing.

According to some disclosed embodiments, the one or more cables is a flat drop cable.

According to some disclosed embodiments, the one or more cables is a round drop cable.

According to some disclosed embodiments, the plurality of distribution ports comprise flexible ports.

According to some disclosed embodiments, the flexible port comprises a seal, a press-in element, and a clip.

According to some disclosed embodiments, the connector is a round plug-in connector configured to contact the seal.

According to some disclosed embodiments, the splice tray comprises a first cavity and a second cavity separated by an interior support wall.

According to some disclosed embodiments, the first cavity and the second cavity are formed by a perimeter wall surrounding and perpendicular to the interior support wall.

According to some disclosed embodiments, the perimeter wall is radiused for routing the one or more cables within the interior compartment without bending of the one or more cables.

According to some disclosed embodiments, splice chip is connected to the interior support wall.

According to some disclosed embodiments, the splice chip includes chip ends at edges of a base of the splice chip and the interior support wall comprises a plurality of undercuts configured to receive the plurality of chip ends so as to couple the splice chip to the splice tray.

According to some disclosed embodiments, the plurality of adapters correspond to the plurality of distribution ports.

According to some disclosed embodiments, the adapter plate includes four adapters and the output adapter includes four distribution ports.

According to some disclosed embodiments, the adapter plate includes twelve adapters and the output adapter includes twelve distribution ports.

According to some disclosed embodiments, the one or more cable retainers include a plurality of prongs for contacting at least one of the one or more cables.

According to some disclosed embodiments, the one or more cables include at least one input cable and a plurality of spliced cables connected to the at least one input cable and being greater in number than the at least one input cable.

BRIEF DESCRIPTION OF THE FIGURES

FIG. 11A is a top view of the splice tray of the optical fiber cassette of FIG. 10A having a single splice chip according to aspects of the present disclosure;

FIG. 11B is a top view of the splice tray of the optical fiber cassette of FIG. 10A having two splice chips according to aspects of the present disclosure;

FIG. 12A is a side view of a portion of a splice tray configured for receiving a splice chip according to aspects of the present disclosure; and FIG. 12B is a side view of the splice tray of FIG. 12A with the splice chip inserted therein according to aspects of the present disclosure.

DETAILED DESCRIPTION

Aspects of the present disclosure provide sealed optical fiber terminals and components that are flexible and customizable. Terminals may be configured differently and customized according to service provider and customer needs.

Various embodiments provide multiple distribution ports. For example, one embodiment may provide four distribution ports. Another embodiment may provide twelve distribution ports. Various embodiments may accept different types of cables, such as flat drop cable or round drop cable.

In some embodiments, the interior compartment of the terminal may incorporate fiber management and bend-radius protection into the design. The unique shape of the interior compartment of the terminal may control fiber bends. Various embodiments may have adapters and may further include a splice tray and a splice chip.

The present disclosure is not limited in terms of the particular embodiments described in this application, which are intended as illustrations of various aspects. Many modifications and variations can be made without departing from its spirit and scope, as will be apparent to those skilled in the art.

Figure 1A:
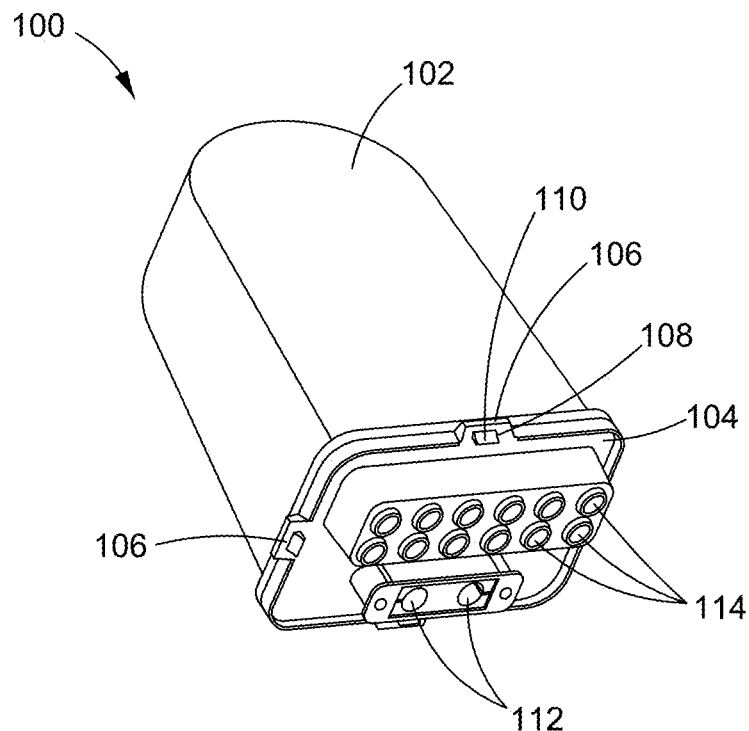
FIG. 1A is a perspective view of one embodiment of a terminal configured according to aspects of the present disclosure.

FIG. 1A is a perspective view of one embodiment of a terminal 100. The terminal 100 includes a housing 102 and a cover 104 configured to couple to the housing of the terminal. The cover 104 may include one or more protrusions 106 having openings 108 configured to receive tabs 110 located on the housing so as to snap the cover to the housing. In other embodiments, the tabs 110 may be located on the cover and the openings 108 may be placed on the housing 102. In yet other embodiments, other types of coupling and locking mechanisms may be used to lock the cover to the housing. For example, latches, bolts, clips, seals, or other locking mechanisms may be used. In some embodiments, the cover 104 may be removable. In other embodiments, the cover 104 may be hinged to the housing 102 such that it is movable with respect to the housing.

The cover 104 may include a plurality of ports, including incoming cable ports 112 and distribution ports 114. In this example, the terminal 100 includes 12 distribution ports. Although the embodiment of FIG. 1A shows two incoming cable ports 112 and 12 distribution ports 114, other embodiments may include a different number of each type of port. In one example, each incoming cable port 112 may be a sealed port, and each distribution port 114 may be a sealed port. Each distribution port 114 may have a breakoff cap. In some embodiments, the distribution ports 114 may have anti-rotation locking features. The distribution ports 114 may be Clearfield FlexPorts. The ports 112 and 114 may include knock-out covers that can be removed once a port 112 and 114 is used. The ports may also be arranged in a different configuration than the embodiment shown in FIG. 1A.

Figure 1B:
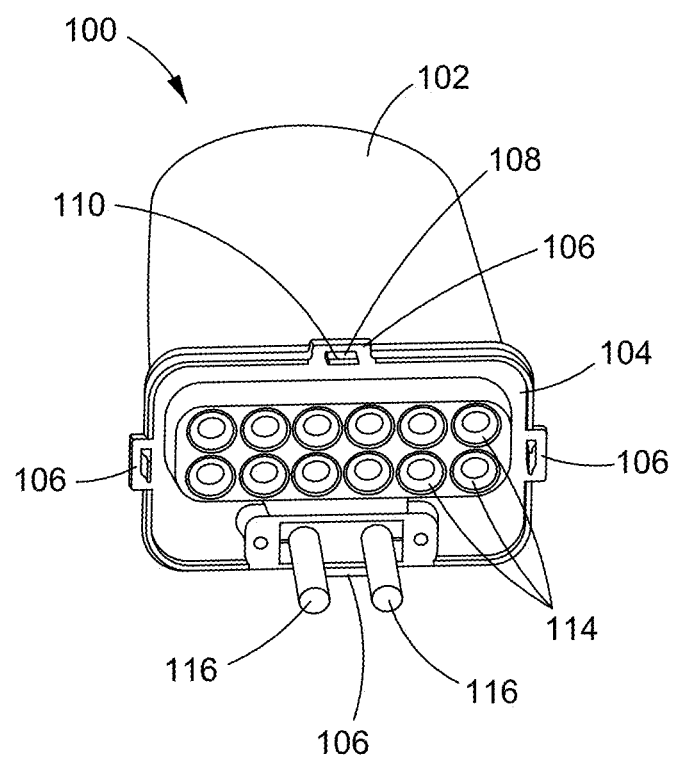
FIG. 1B is a perspective view of the terminal of FIG. 1A, further showing incoming cables according to aspects of the present disclosure.

FIG. 1B is a perspective view of the terminal 100 of FIG. 1A, further showing incoming cables 116 inserted into the incoming cable ports 112. The incoming cables 116 are round cables. In other embodiments, the terminal may be configured to receive other types of cables such as a flat drop cable, as shown and described below in relation to FIG. 2B.

Figure 2A:
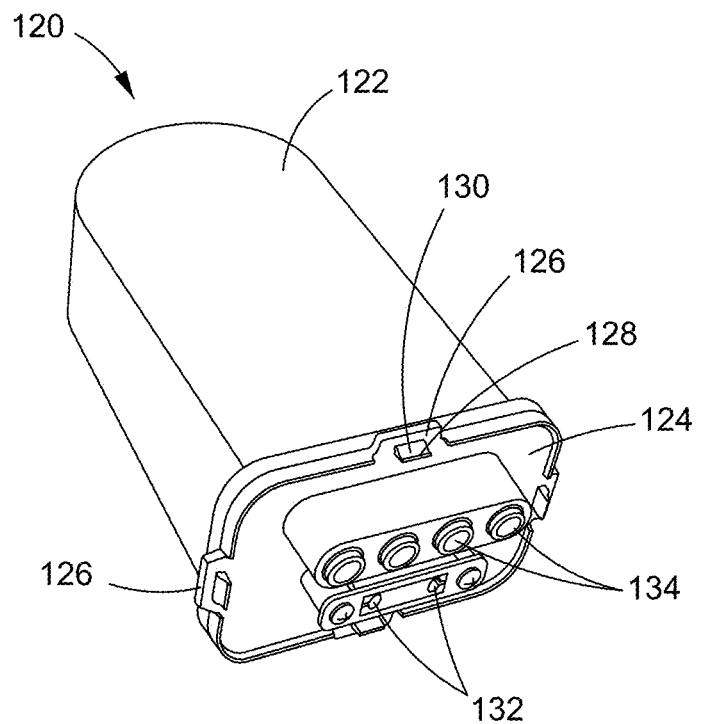
FIG. 2A is a perspective view of another embodiment of a terminal configured according to aspects of the present disclosure.

FIG. 2A is a perspective view of another embodiment of a terminal 120. The terminal 120 includes a housing 122 and a cover 124 configured to couple to the housing of the terminal. The cover 124 may include one or more protrusions 126 having openings 128 configured to receive tabs 130 located on the housing so as to snap the cover to the housing. In other embodiments, the tabs 130 may be located on the cover and the openings 128 may be placed on the housing 122. In yet other embodiments, other types of coupling and locking mechanisms may be used to lock the cover to the housing. For example, latches, bolts, clips, seals, or other locking mechanisms may be used. In some embodiments, the cover 124 may be removable. In other embodiments, the cover 124 may be hinged to the housing 122 such that it is movable with respect to the housing.

The cover 124 may include a plurality of ports, including incoming cable ports 132 and distribution ports 134. In this example, the terminal 120 includes 4 distribution ports. Although the embodiment of FIG. 2A shows two incoming cable ports 132 and 4 distribution ports 134, other embodiments may include a different number of each type of port. In one example, each incoming cable port 132 may be a sealed port, and each distribution port 134 may be a sealed port. Each distribution port 134 may have a breakoff cap. In some embodiments, the distribution ports 134 may have anti-rotation locking features. The distribution ports 134 may be Clearfield FlexPorts. The ports 132 and 134 may include knock-out covers that can be removed once a port 132 and 134 is used. The ports may also be arranged in a different configuration than the embodiment shown in FIG. 2A.

Figure 2B:
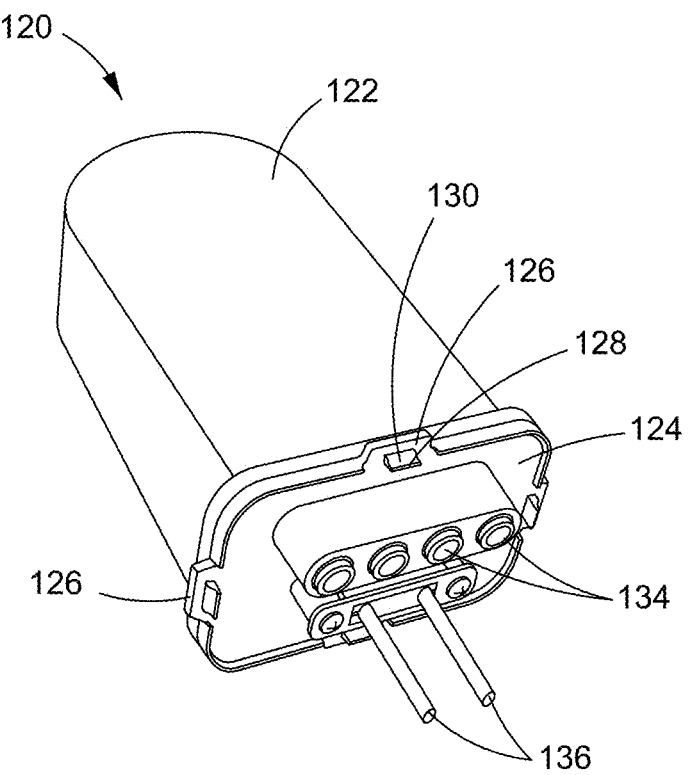
FIG. 2B is a perspective view of the terminal of FIG. 2A, further showing incoming cables according to aspects of the present disclosure.

FIG. 2B is a perspective view of the terminal 120 of FIG. 2A, further showing incoming cables 136 inserted into the incoming cable ports 132. The incoming cables 136 are flat drop cables. In other embodiments, the terminal may be configured to receive other types of cables such as a round cable, as shown and described above in relation to FIG. 1B.

Figure 3:
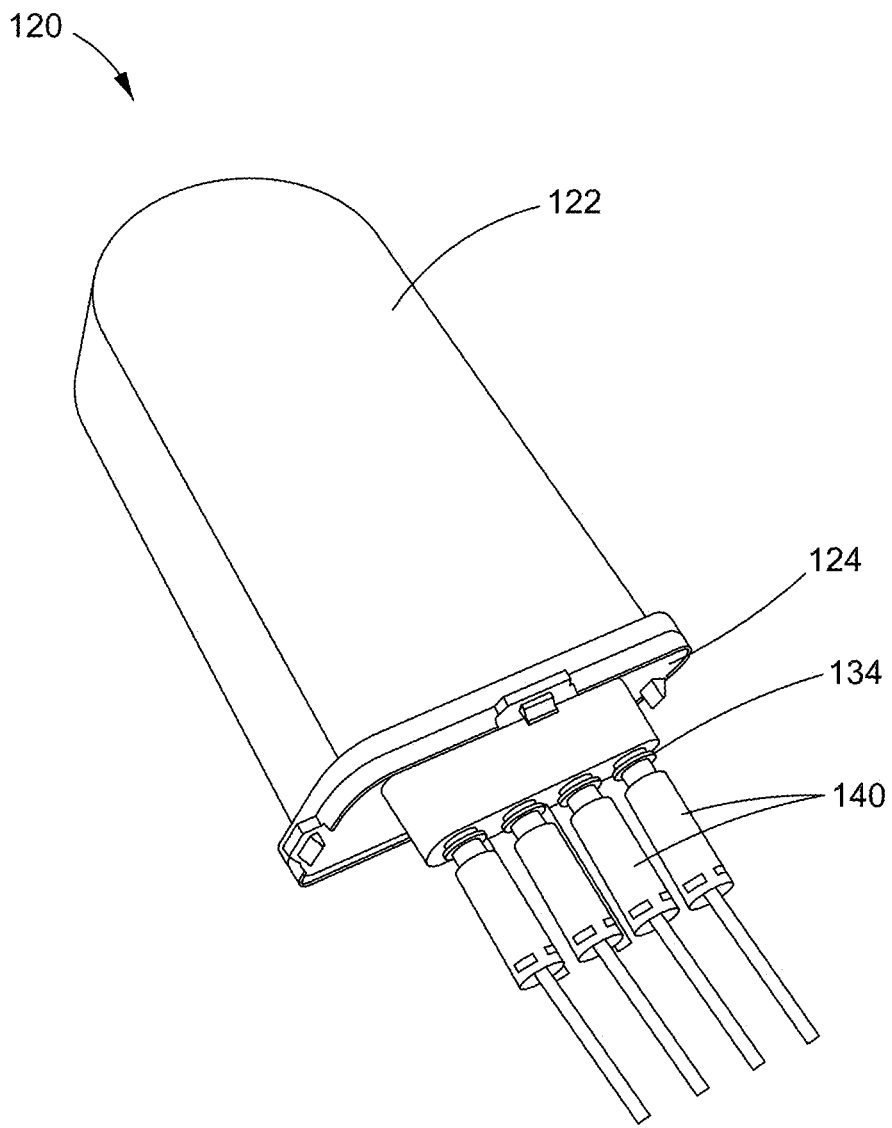
FIG. 3 is a perspective view of the terminal of FIG. 2A, further showing connectors installed in the ports according to aspects of the present disclosure.

FIG. 3 is a perspective view of the terminal 120 of FIG. 2A, further showing connectors 140 installed in the distribution ports 134. In various embodiments, the distribution ports 134 may be Clearfield FlexPorts and the connectors 140 may be Clearfield Flex Connectors.

Figure 4A:
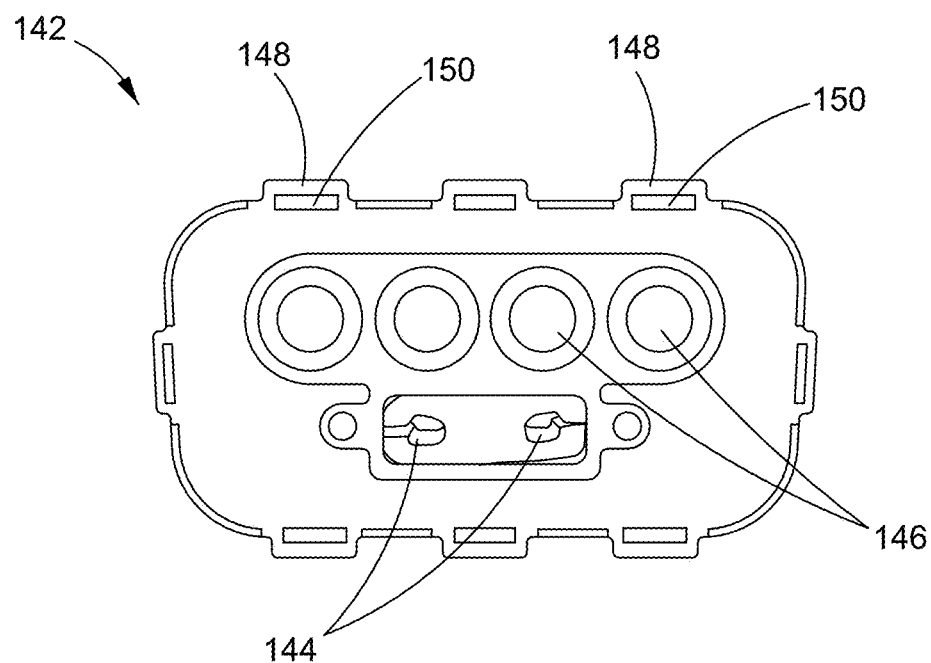
FIG. 4A is a front view of one embodiment of a cover having ports configured according to aspects of the present disclosure.

FIG. 4A is a front view of one embodiment of a cover 142 having two incoming cable ports 144 and four distribution ports 146. Other embodiments may include a different number of each type of port. Each of the incoming cable ports 142 and the distribution ports 144 may be a sealed port. The incoming cable ports 144 are configured to receive round cables. In some embodiments, each of the incoming cable ports may be configured to accept multiple cable types. The cover 142 further includes protrusions 148 having openings 150 configured to receive respective tabs of a terminal housing to couple the cover to the housing.

Figure 4B:
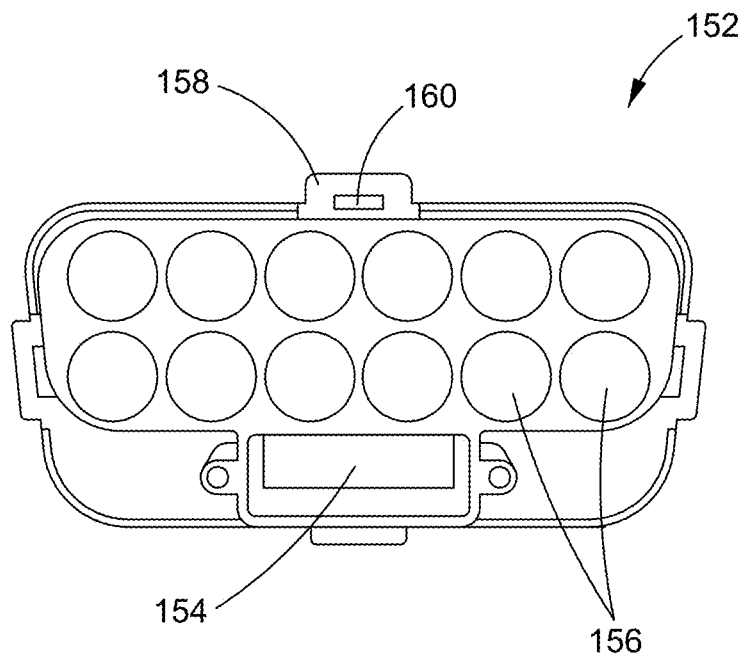
FIG. 4B is a front view of another embodiment of a cover having ports configured according to aspects of the present disclosure.

FIG. 4B is a front view of another embodiment of a cover 152 having an incoming cable port 154 and twelve distribution ports 156. Other embodiments may include a different number of each type of port. The incoming cable port 154 is configured to receive a flat drop cable. Each of the incoming cable port 154 and the distribution ports 156 may be a sealed port. The cover 152 further includes protrusions 158 having openings 160 configured to receive respective tabs of a terminal housing to couple the cover to the housing. In various embodiments disclosed herein, each distribution port, such as distribution ports 146 and 156, may have a respective entrance tab disposed within the cover or the housing of the terminal. The entrance tabs must be broken off to use the respective ports.

Figure 5:
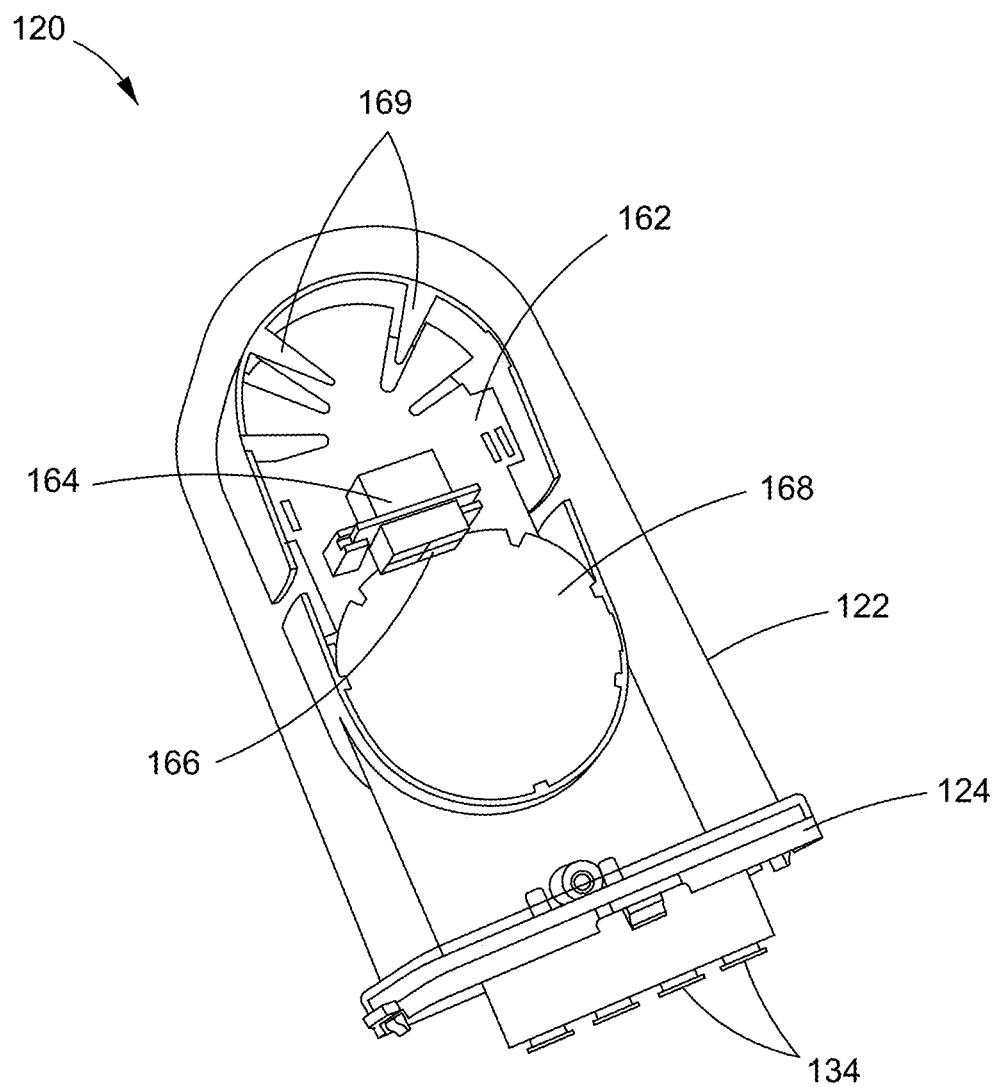
FIG. 5 is a perspective view of the terminal of FIG. 2A, further showing the interior compartment according to aspects of the present disclosure.

FIG. 5 is a perspective view of the terminal 120 of FIG. 2A, further showing the interior compartment 162. The interior compartment 162 includes at least one adapter plate 164. The adapter plate 164 may include a plurality of adapters. The adapters may correspond to the distribution ports 134. For example, the adapter plate 164 includes 4 adapter slots 166, each slot corresponding to a respective one of the 4 distribution port 134. Other embodiments may comprise a different number of ports and adapters slots.

The interior compartment 162 has a unique shape configured to control fiber bends. The interior compartment 162 is further configured to hold at least one fiber splice tray 168. In some embodiments, the terminal 120 may include a module or cassette having splice and fiber management area. The cassette may be configured to terminate the fiber that runs into the terminal 120. Various embodiments may include different types or configurations of cassettes. In various embodiments, the interior compartment may provide slack storage capacity. A splice tray may comprise a plurality of prongs 169 for fiber management and storage.

Figure 6:
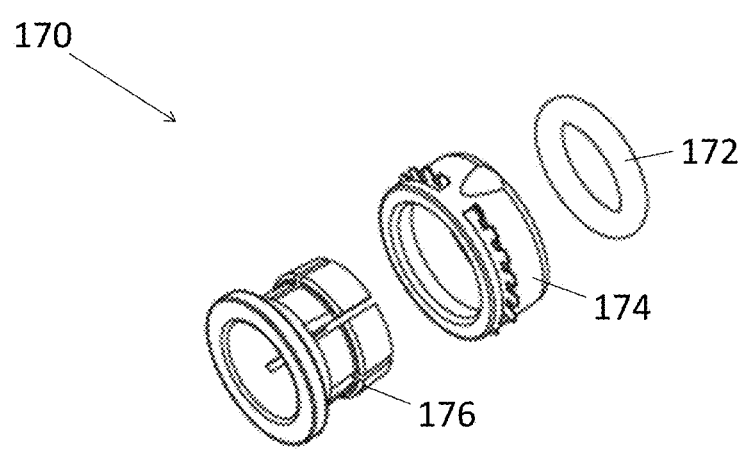
FIG. 6 is a perspective view of one embodiment of a flexible port (FlexPort) according to aspects of the present disclosure.

In various embodiments disclosed herein, the plurality of distribution ports may be configured to be sealed ports. In one embodiment, each distribution port may be sealed by installing a flexible port (Clearfield FlexPort) therein. FIG. 6 is a perspective view of one embodiment of a flexible port 170 (FlexPort). The flexible port 170 comprises a seal, such as an O-Ring 172, a press-in element 174 and a clip 176. In some embodiments, a flexible port 170 may be pre-installed within the distribution ports 134 of the terminal 120. In other embodiments, a flexible port 170 may be installed in the field. A flexible port 170 may be installed by placing the seal or O-ring 172 into the desired port hole, placing the press-in element 174 into the hole, and installing the clip 176 into the press-in element. The flexible ports 170 may further comprise entrance tabs that must be broken off prior to usage of the flexible ports.

Figure 7:
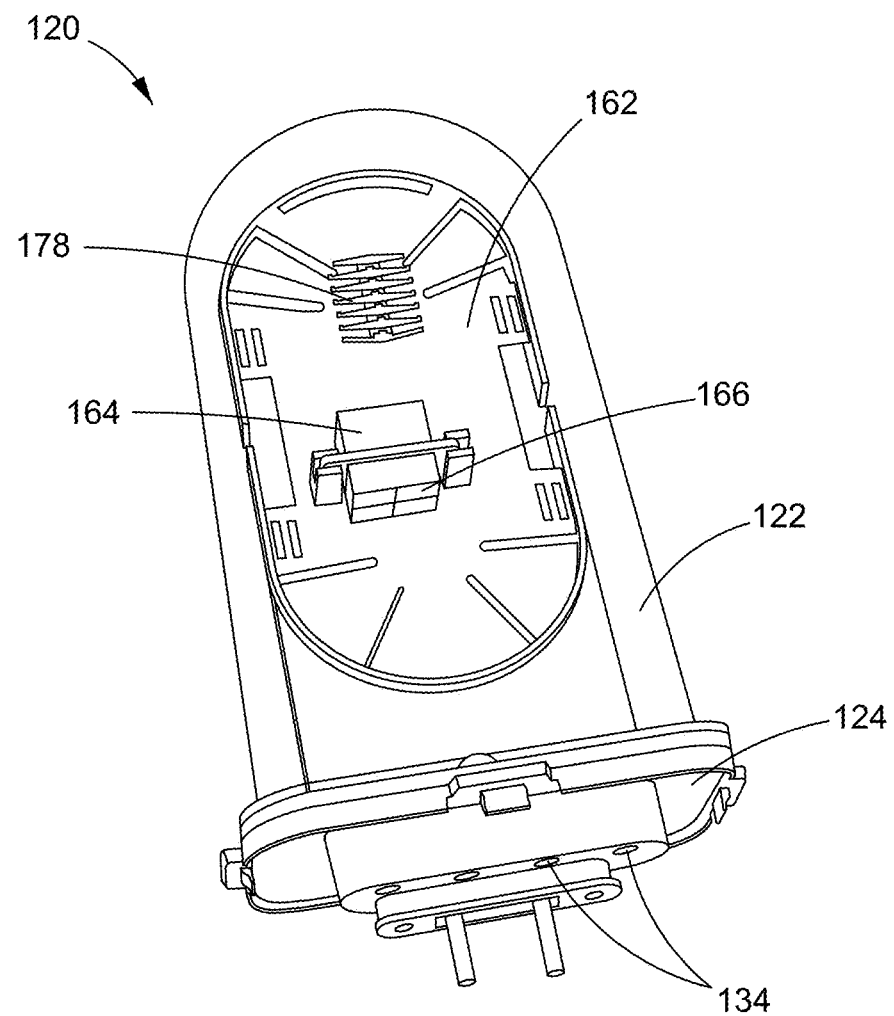
FIG. 7 is a perspective view of the terminal of FIG. 2A, further showing a splice chip in the interior compartment according to aspects of the present disclosure.

In various embodiments disclosed herein, the splice trays may include stackable loose tube fiber splice chips, as discussed below in relation to FIGS. 8A to 8C. FIG. 7 is a perspective view of the terminal 120 of FIG. 2A, further showing a splice chip 180 in the interior compartment 162.

Figure 8A:
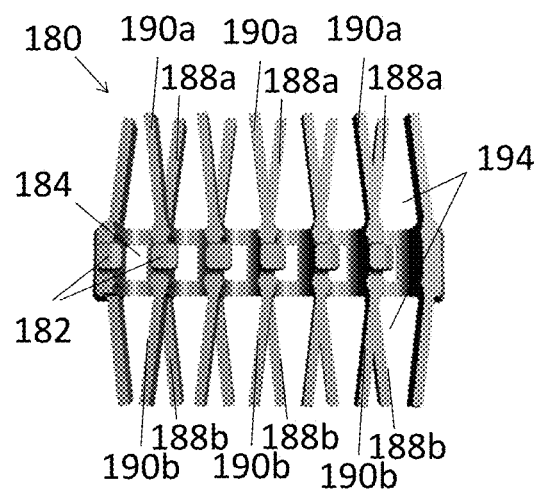
FIG. 8A is a top view of one embodiment of a splice chip configured according to aspects of the present disclosure.
Figure 8B:
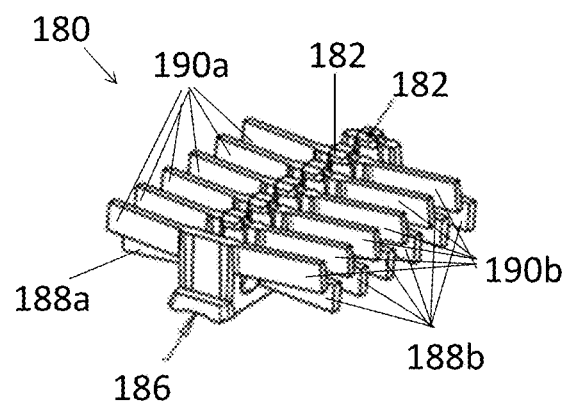
FIG. 8B is a perspective view of the splice chip of FIG. 8A.
Figure 8C:
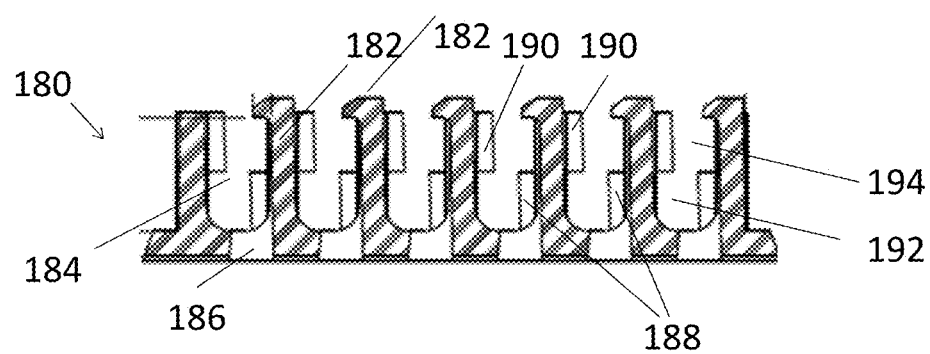
FIG. 8C is a cross-sectional side view of the splice chip of FIG. 8A.

FIG. 8A is a top view of one embodiment of a splice chip 180, FIG. 8B is a perspective view of the splice chip 180, and FIG. 8C is a cross-sectional side view of the splice chip 180. Referring now to FIGS. 8A to 8C, the splice chip 180 includes a plurality of central posts 182 spaced apart from each other. For example, the central posts 182 may be spaced apart equidistantly from each other, forming a plurality of slots 184, each slot located between a pair of posts. As shown in FIGS. 8B and 8C, the plurality of posts 182 may be arranged vertically along an elongated base 186.

Each post 182 has a plurality of protrusions emanating therefrom, on either side of the base 186. The protrusions may comprise lower protrusions 188 that emanate from a lower portion of the posts 182, and upper protrusions 190 that emanate from upper portions of the posts 182, as shown for example in FIG. 8C. Thus, the lower protrusions 188 and the upper protrusions 190 divide each slot 184 into two stacked slots comprising a lower slot 192 and an upper slot 194. The lower protrusions 188 and the upper protrusions 190 may be angled relative to each other as shown for example in FIGS. 8A and 8B, and may form stacked elongated slots 192 and 194 for storing loose tube fiber splices. All the lower protrusions 188a on a first side (side a) of the base 186 may be oriented substantially parallel to each other, and all the upper protrusions 190a on the first side of the base may be oriented substantially parallel to each other. Further, all the lower protrusions 188b on a second side (side b) of the base 186 may be oriented substantially parallel to each other, and all the upper protrusions 190b on the second side of the base may be oriented substantially parallel to each other. In one embodiment, the lower protrusions 188a on one side of the base 186 may be oriented substantially parallel to the upper protrusions 190b on the other side of the base. Similarly, the upper protrusions 190a on one side of the base 186 may be oriented substantially parallel to the lower protrusions 188b on the other side of the base, so as to form an "X" pattern of protrusions 188 and 190 emanating from a plurality of posts 182.

As shown in FIGS. 8A to 8C, the splice chip 180 has six elongated upper slots 194. The splice chip 180 also has six elongated lower slots 192. Each of the lower slots 192 is located under a corresponding upper slot 194. Thus, each splice chip 180 holds 12 loose tube fiber splices: six splices stacked on top of six splices.

In various embodiments disclosed herein, a splice tray may be configured to receive one or more splice chips 180. A splice tray may include a plurality of slots, each slot being configured to receive a respective splice chip 180. For example, a slot may be configured to couple to at least a portion of the base 186 of a splice chip 180. Other embodiments of splice trays and splice chips may comprise a different mechanism for coupling.

Figure 9:
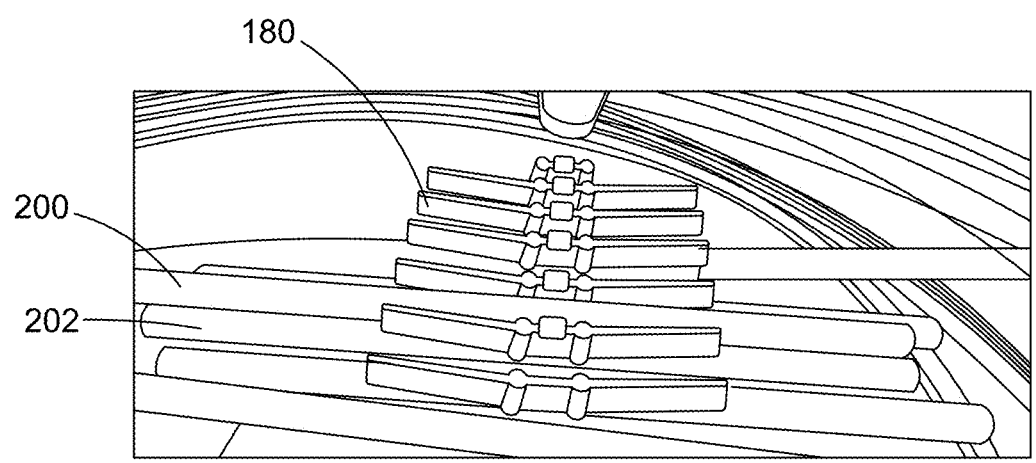
FIG. 9 is a close-up view of a splice chip showing stacked loose tube fiber splices disposed therein according to aspects of the present disclosure.

FIG. 9 is a close-up view of a splice chip 180, showing splices 200 and 202 stored in the top and bottom rows or slots of the splice chip, respectively. Thus, the splice chip 180 accommodates stacked loose tube fiber splices 200 and 202, up to a maximum of 12 splices.

Figures 10A, 10B:
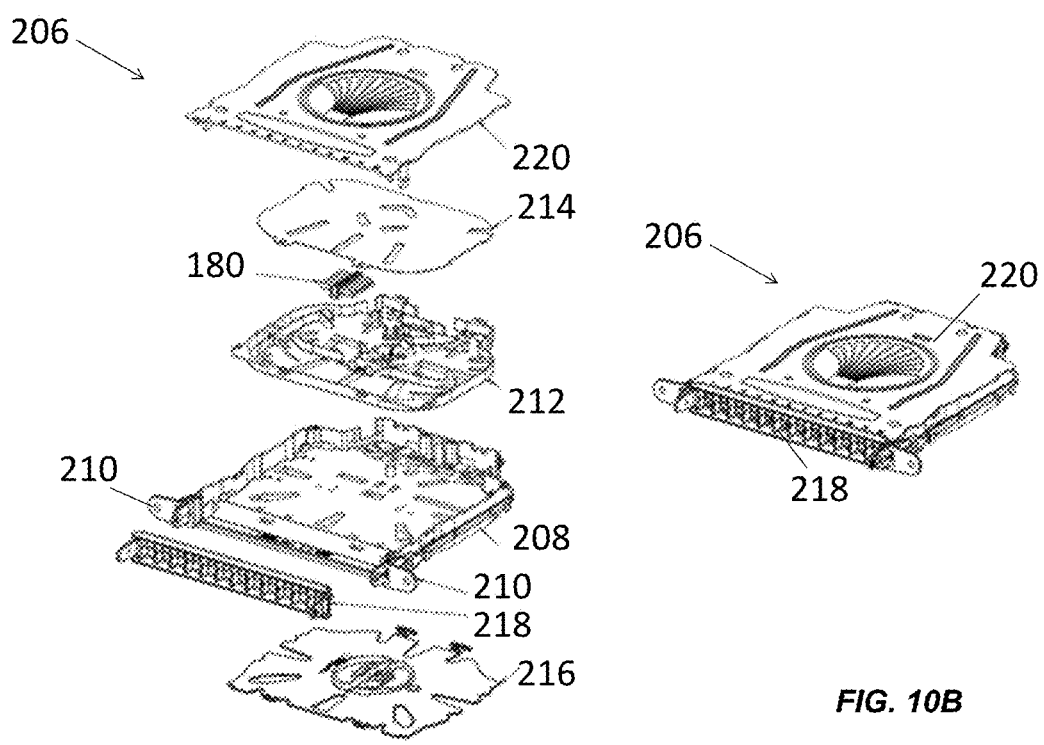
FIG. 10A is an exploded perspective view of an optical fiber cassette having a loose tube fiber splice chip configured according to aspects of the present disclosure.
FIG. 10B is a perspective view of the optical fiber cassette of FIG. 10A.

Some embodiments of the terminals disclosed herein may comprise fiber management modules or cassettes. Various embodiments of fiber management cassettes may comprise stackable loose tube fiber splice chips such as the splice chip 180 illustrated in FIGS. 8A to 8C. FIG. 10A is an exploded perspective view of one embodiment of an optical fiber cassette 206 having a loose tube fiber splice chip 180. The cassette 206 comprises a base 208 having mounting tabs 210. The cassette 206 further comprises a splice tray 212 and a splice tray cover 214 configured to couple to the splice tray. The splice tray is configured to receive at least one splice chip 180. The base 208 comprises a slack storage area and is configured to couple to a slack storage cover 216. The cassette 206 further comprises an adapter plate 218 and a top cover 220 configured to couple to the base 208. FIG. 10B is a perspective view of the assembled optical fiber cassette 206, showing the adapter plate 218 positioned at the front of the cassette and the top cover 220 positioned at the top of the cassette.

FIG. 11A is a top view of the splice tray 212 of the optical fiber cassette 206. The splice tray 212 includes a single splice chip 180. The splice tray 212 may also accommodate two splice chips 180, as shown for example in FIG. 11B. Other embodiments of splice trays and cassettes may accommodate a different number or arrangement of splice chips. The splice tray further comprises a fiber routing and management area.

FIG. 12A is a side view of a portion of the splice tray 212 configured for receiving a splice chip 180. The splice chip 180 includes a plurality of chip ends 222 at the edges of the base 186 of the splice chip. The splice tray 212 includes a plurality of undercuts 224 configured to receive the plurality of chip ends 222 so as to couple the splice chip 180 to the splice tray. The chip ends 222 may be bent down as shown by the arrows and may be inserted below the undercuts 224 in the splice tray 212. FIG. 12B shows the splice chip 180 inserted into the splice tray 212, with the chip ends 222 positioned below the undercuts 224 of the splice tray. In other embodiments, different mechanisms may be used to couple the splice chips to the splice tray.

Embodiments of terminals disclosed herein, such as terminal 120, may be used in optical fiber distribution systems. For example, an incoming cable port of terminal 120 may be configured to receive an incoming cable having a plurality of fibers into the terminal. The terminal may be configured to allow connecting the fibers to a cassette, module or adapters within the terminal. Drop cables may be supplied to user locations through one or more distribution ports. Various user locations may be equipped with tap boxes configured to receive one or more fibers and to connect them to the user locations.

Various embodiments of terminals disclosed herein provide flexible and hardened terminals. Various embodiments of terminals disclosed herein are environmentally sealed terminals, thereby providing maximum reliability and durability in the harshest OSP environments.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

We claim:

1. A customizable optical fiber terminal, comprising:
   a splice tray comprising one or more cable retainers including a plurality of prongs configured to route one or more cables within an interior compartment; and
   a splice chip connected to the splice tray and having a base comprising a plurality of posts positioned vertically relative to the base, and a lower protrusion and an upper protrusion emanating from at least one of the plurality of posts, wherein a lower slot is formed between a first post of the at least one of the plurality of posts and the lower protrusion, and an upper slot is formed between a second post adjacent to the first post of the at least one of the plurality of posts and the upper protrusion, wherein the lower protrusion is configured to bias a bottom splice in the lower slot towards the first post.

2. The customizable optical fiber terminal of claim 1, wherein the upper protrusion is configured to bias a top splice in the upper slot towards the second post.

3. The customizable optical fiber terminal of claim 1, further comprising a housing having an interior compartment, wherein the splice tray is positioned in the interior compartment.

4. The customizable optical fiber terminal of claim 3, wherein the housing includes a distal end having a radiused wall for routing one or more cables within the interior compartment without bending of the one or more cables.

5. The customizable optical fiber terminal of claim 3, further comprising:
   a cover connected to the housing to close the interior compartment and comprising:
      a plurality of input ports for receiving the one or more cables;
      an output adapter module comprising a plurality of distribution ports each for receiving a connector for connection to the one or more cables; and
      a flexible port disposed within at least one of the plurality of distribution ports, wherein the flexible port comprises a seal, a press-in element, and a clip, wherein the press-in element is configured to retain the seal within the at least one of the plurality of distribution ports, and wherein the clip is configured to retain the connector.

6. The customizable optical fiber terminal of claim 5, wherein the plurality of input ports and the plurality of distribution ports are positioned entirely on the cover.

7. The customizable optical fiber terminal of claim 5, wherein the splice chip comprises chip ends at edges of the base of the splice chip and the splice tray comprises a plurality of undercuts configured to receive the chip ends so as to couple the splice chip to the splice tray.

8. The customizable optical fiber terminal of claim 1, wherein one or more of the plurality of prongs are configured for contacting at least one of the one or more cables.

9. A customizable optical fiber terminal, comprising:
   a splice chip configured for connecting to a splice tray, the splice chip having a base comprising a plurality of posts positioned vertically relative to the base, and a lower protrusion and an upper protrusion emanating from at least one of the plurality of posts, wherein a lower slot is formed between a first post of the at least one of the plurality of posts and the lower protrusion, and an upper slot is formed between a second post adjacent to the first post of the at least one of the plurality of posts and the upper protrusion, wherein the upper protrusion is configured to bias a top splice in the upper slot towards the second post.

10. The customizable optical fiber terminal of claim 9, further comprising a splice tray connected to the splice chip, the splice tray comprising one or more cable retainers.

11. The customizable optical fiber terminal of claim 9, wherein the lower protrusion is configured to bias a bottom splice in the lower slot towards the first post.

12. The customizable optical fiber terminal of claim 9, further comprising a housing having an interior compartment, wherein the splice tray is positioned in the interior compartment.

13. The customizable optical fiber terminal of claim 12, wherein the housing includes a distal end having a radiused wall for routing one or more cables within the interior compartment without bending of the one or more cables.

14. The customizable optical fiber terminal of claim 12, further comprising:
 a cover connected to the housing to close the interior compartment and comprising:
  a plurality of input ports for receiving one or more cables;
  a flexible port disposed within at least one of a plurality of distribution ports, wherein the flexible port comprises a seal, a press-in element, and a clip, wherein the press-in element is configured to retain the seal within the at least one of the plurality of distribution ports, and wherein the clip is configured to retain a connector.

15. The customizable optical fiber terminal of claim 14, wherein the plurality of input ports are positioned entirely on the cover.

16. The customizable optical fiber terminal of claim 14, wherein the splice chip comprises chip ends at edges of the base of the splice chip and the splice tray comprises a plurality of undercuts configured to receive the chip ends so as to couple the splice chip to the splice tray.

17. The customizable optical fiber terminal of claim 14, further comprising a plurality of distribution ports.

18. The customizable optical fiber terminal of claim 17, wherein the plurality of distribution ports are positioned entirely on the cover.

\* \* \* \* \*